(12) United States Patent
Elizalde Rodarte

(10) Patent No.: US 7,710,071 B2
(45) Date of Patent: *May 4, 2010

(54) CHARGING A PORTABLE ELECTRICAL DEVICE

(75) Inventor: Luis Ernesto Elizalde Rodarte, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/351,892

(22) Filed: Jan. 12, 2009

(65) Prior Publication Data

US 2009/0121681 A1    May 14, 2009

Related U.S. Application Data

(62) Division of application No. 11/132,657, filed on May 19, 2005, now Pat. No. 7,477,039.

(51) Int. Cl.
*H02J 7/00* (2006.01)
*H02K 7/14* (2006.01)
*F21L 4/00* (2006.01)

(52) U.S. Cl. ............... 320/115; 320/107; 320/114; 310/50; 361/183

(58) Field of Classification Search ........... 320/115, 320/114, 107; 310/50; 362/183
See application file for complete search history.

(56) References Cited

U.S. PATENT DOCUMENTS

| 3,840,795 | A | * | 10/1974 | Roszyk et al. | 320/108 |
| 7,026,789 | B2 | * | 4/2006 | Bozzone et al. | 320/108 |
| 2003/0146735 | A1 | | 8/2003 | Barbeau et al. | |
| 2005/0127850 | A1 | | 6/2005 | Baarman et al. | |

* cited by examiner

*Primary Examiner*—Edward Tso
*Assistant Examiner*—Yalkew Fantu
(74) *Attorney, Agent, or Firm*—Roy W. Truelson

(57) ABSTRACT

A portable electrical device requiring periodic recharging mates with a corresponding charging device by dropping or placing the portable device on or in the charger without pre-alignment by the user. The charger-to-device interface self aligns the portable electrical device in the charger for charging. Preferably, the charger is a bowl-shaped cradle. The portable device sinks to the bottom of the bowl using the force of gravity and thus aligns the contacts for recharging. Optional magnets may provide additional force to guide alignment.

13 Claims, 9 Drawing Sheets

CHARGING A PORTABLE ELECTRICAL DEVICE

CROSS REFERENCE TO RELATED APPLICATIONS

This is a divisional application of pending U.S. patent application Ser. No. 11/132,657, filed May 19, 2005, entitled "Method and Apparatus for Charging a Portable Electrical Device", which is herein incorporated by reference. This application claims priority under 35 U.S.C. §120 of U.S. patent application Ser. No. 11/132,657, filed May 19, 2005.

The present application also related to the following commonly assigned copending design patent applications, both of which are incorporated by reference:

Application Ser. No. 29/213,910, filed Sep. 23, 2004, entitled "Portable Digital Audio Player"; and Application Ser. No. 29/215,158, filed Oct. 14, 2004, entitled "Charging Bowl for Portable Digital Audio Player".

FIELD OF THE INVENTION

The present invention relates to portable electrical devices, and in particular, to a charging interface for charging a stored energy source within a portable electrical device.

BACKGROUND OF THE INVENTION

In the latter half of the twentieth century, there began a phenomenon known as the information revolution. The information revolution is a historical development broader in scope than any one event or machine, and while often associated with large general-purpose computers, it has often found expression in much smaller devices. In fact, one of the remarkable aspects of the information revolution is how digital electronic processors are used to enhance the capabilities of other devices, from automobiles to refrigerators.

The information revolution has spawned a large variety of portable electrical devices. Specifically, the expanding capabilities and shrinking physical size of digital electronic devices have encouraged the development of portable devices. This phenomenon has made it possible, for example, for anyone to walk into an electronics store and purchase a laptop computer which is far faster and more capable than the most advanced and expensive computing systems of the 1950s, systems which might have occupied entire floors of buildings. Because it is now possible to place powerful processing capability in a single chip on a relatively small device, new uses have been created and are being created for portable devices with digital processing capability. Examples of such portable devices include cell and cordless telephones, personal digital assistants (PDAs), music and video players, laptop computers, and a wide range of sensing, testing and diagnostic devices for medical, environmental, or industrial purposes.

Although some devices are considered "portable" simply because they can be moved from place to place, of particular interest herein are those portable electrical devices which contain their own source of stored electrical energy (e.g. batteries), and are therefore not dependent on the proximity of an external source of electrical power. The information revolution has caused many new and varied types of such portable electrical devices to be used, but it must be remembered that battery-operated portable electrical devices have been around for a long time, and do not necessarily require digital data processing capability. For example, battery operated power tools, toys, flashlights and so forth have been in use for many years, and continue to be used.

Many portable electrical devices, especially digital electronic devices, contain rechargeable batteries. In some cases, these rechargeable batteries are recharged by removing them from the portable device, placing them in a special purpose charging device (usually connected to a line voltage source) until the electrical charge is sufficiently replenished, and then re-installing the batteries in the portable device. This method has obvious disadvantages from the standpoint of convenience to the user, and also introduces the possibility that the user will place the batteries in the charger in an erroneous orientation, re-install the batteries in the device in an erroneous orientation, or in some other manner cause damage to the batteries and/or the electrical device during the process of recharging the batteries. In order to reduce these hazards and make recharging more convenient, many portable electrical devices are design to be coupled directly to a charging device or voltage, without requiring removal of the batteries. This mode of recharging is particularly common in the case of cell and portable telephones, which require frequent recharging.

If a portable device having rechargeable batteries is coupled to a charging device (without removal of the batteries), coupling is typically accomplished by either mating an electrical plug connected by cable to either the charger or the device with a corresponding receptacle, or by placing the portable device in a cradle formed by the charging device so that electrical contacts align. In some cases, the portable device is plugged directly into a line voltage receptacle, the portable device containing all the electronics required for transforming and rectifying a line voltage signal.

Although any of these techniques is generally more convenient than removal of the batteries for recharging, and is less likely to cause damage to the device and/or batteries, these techniques still require a certain level of attention and interaction on the part of the user. I.e., the user must visually or otherwise align certain mating components to a relatively narrow degree, and place the mating components in proper relative position.

While the burden of visually or otherwise aligning a portable electrical device with respect to its corresponding charging device and placing the two in proper position may seem like a small matter, it can cause inconvenience in a variety of ways, particularly as the number of such portable devices increases. For example, it may be difficult to couple the portable device to the charger while performing some other task requiring visual concentration; the need for visual alignment usually limits the acceptable locations of charging devices to those locations having ample light and at the proper height for convenient visual alignment; certain individuals with physical handicaps may find it particularly difficult; etc. As a particular example, a user may wish to couple a portable device to a recharging device while performing another complex task, such as driving an automobile. A need exists, not necessarily generally recognized, for an improved interface between a portable electrical device and its charging device, which will require less attention and interaction on the part of the user.

SUMMARY OF THE INVENTION

A portable electrical device requiring periodic recharging mates with a corresponding charging device by dropping or placing the portable device on or in the charger without pre-alignment by the user. The charger-to-device interface self aligns the portable electrical device in the charger for charging.

In one aspect of the preferred embodiment, the charger is a concave cradle which is open at the top. The portable device is placed or dropped in the cradle, and sinks to an aligned position at the bottom of the cradle using the force of gravity.

In another aspect of the preferred embodiment, the mating surfaces of the charger and portable device are radially symmetrical about a vertical axis. When the portable device is placed in or on the charger, the device is either aligned with respect to the charger at any arbitrary angular orientation, or aligned at a plurality of discrete angular orientations, the charger and device automatically self-aligning to one of the plurality of discrete angular orientations.

In a specific preferred embodiment, the charger forms a bowl-shaped concave cradle having a cross-section in the horizontal plane which is circular about a substantially vertical axis. The portable device has a surface conforming to the bowl-shaped cradle. A pair of electrical contact rings, concentric about the vertical axis, is embedded in the surface of the cradle. The contours of the cradle and device cause gravity to force the device to the bottom of the cradle where the device will mate electrically with the charger, regardless of the angular orientation of the portable device with respect to the vertical axis.

Various alternative shapes for the mating surfaces of the charger and portable device are possible, such as shapes in which a horizontal cross-section of a mating surface is a regular polygon, a star, an ellipse, or any of various other shaves. Furthermore, the charger need not have a concave mating surface, nor must the mating surfaces be radially symmetrical.

In an additional aspect of the preferred embodiment, magnets may be placed in the charger and/or portable device to provide additional alignment force. A charging interface for a rechargeable portable electrical device in accordance with the preferred embodiment of the present invention requires less concentration, visibility and/or dexterity than conventional charging interfaces. It is not only easier to use, but increases the flexibility in the way or location in which such a device is used. A bowl-shaped charger can be analogized to a small bowl or tray in which keys or similar objects are routinely placed. A user can place a portable device in the charger with a minimal amount of effort and user attention immediately upon entering his abode or while driving his car, at a time when the user is likely to be distracted with other tasks, carrying other objects, and so forth. Moreover, the charger can be located almost anywhere within arms reach, even if the location (e.g., a high shelf, under an instrument panel of a vehicle, etc.) is such that the user can not visually guide the alignment. Additionally, persons with certain physical handicaps may find such a charging interface significantly easier to use.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The invention described herein relates to an interface for mating a portable electrical device requiring periodic recharging with a charging device providing electrical energy to the portable electrical device. Both the portable electrical device and the charging device must be constructed so as to be compatible with each other, i.e., to have appropriate mating surfaces, appropriately located electrical contacts or other features for the transmission of electrical energy from the charging device to the portable electrical device, and so forth. Therefore, in the preferred and certain alternative embodiments described herein, a pair of devices (the portable device and the charging device) are shown and described. However, the claims herein do not necessarily require the presence of a pair of compatible devices, and either one of the devices alone may infringe certain of the claims herein.

Figure 1:
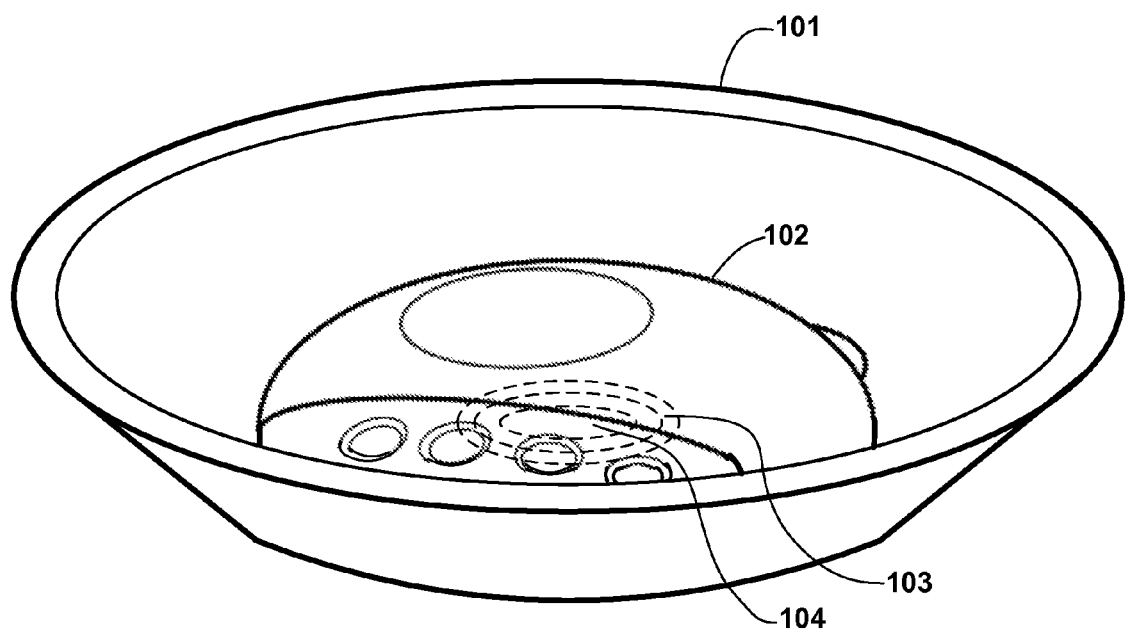
FIG. 1 is a simplified perspective view showing a the major components of a charging interface for a portable electrical device, according to the preferred embodiment.

Referring to the Drawing, wherein like numbers denote like parts throughout the several views, FIG. 1 is a perspective view showing a the major components of a charging interface for a portable electrical device, according to the preferred embodiment. FIG. 1 represents the outlines of a charging device 101 and corresponding portable rechargeable electrical device 102 to which charging device 101 supplies electrical charging energy. For clarity of illustration, certain decorative and functional features of devices 101 and 102 are not shown in FIG. 1. Charging device 101, herein also referred to as a "charging bowl", is a generally bowl-shaped device, having an upwardly exposed concave surface. Portable rechargeable device 102 is a generally discus-shaped device, which rests within charging bowl 101 during a recharging operation. At least a portion of the rear surface of portable charging device 102 opposes and conforms generally to a corresponding portion of the upwardly exposed concave surface of charging bowl 101. Electrical contact areas 103, 104 of opposing polarity are situated on the conforming opposed surfaces of charging bowl 101 and portable charging device 102. In the preferred embodiment, the contact areas comprise a circular contact 104 and a concentric ring 103, both being centered about a common axis, which is the central axis of both the charging bowl 101 and the disk-shaped portable device 102. Contact areas 103, 104, are located underneath rechargeable device 102, and therefore represented as dashed lines in FIG. 1.

It will be observed that the contacts on the opposed surfaces are in proper position with respect to one another and mate with the corresponding contacts in the other device provided only that the portable device is resting at the bottom of the charging bowl. In this position, the central axes of the charging bowl and of the portable device are substantially coincident. Specifically, because the contacts are circles and concentric rings, the contacts mate in proper orientation, regardless of the angular orientation of the portable device with respect to the central axis. Gravity and/or a magnetic force naturally forces the portable device to this aligned position when it is dropped or placed anywhere within the bowl, without the need for the user to pre-align the portable device.

Figure 2:
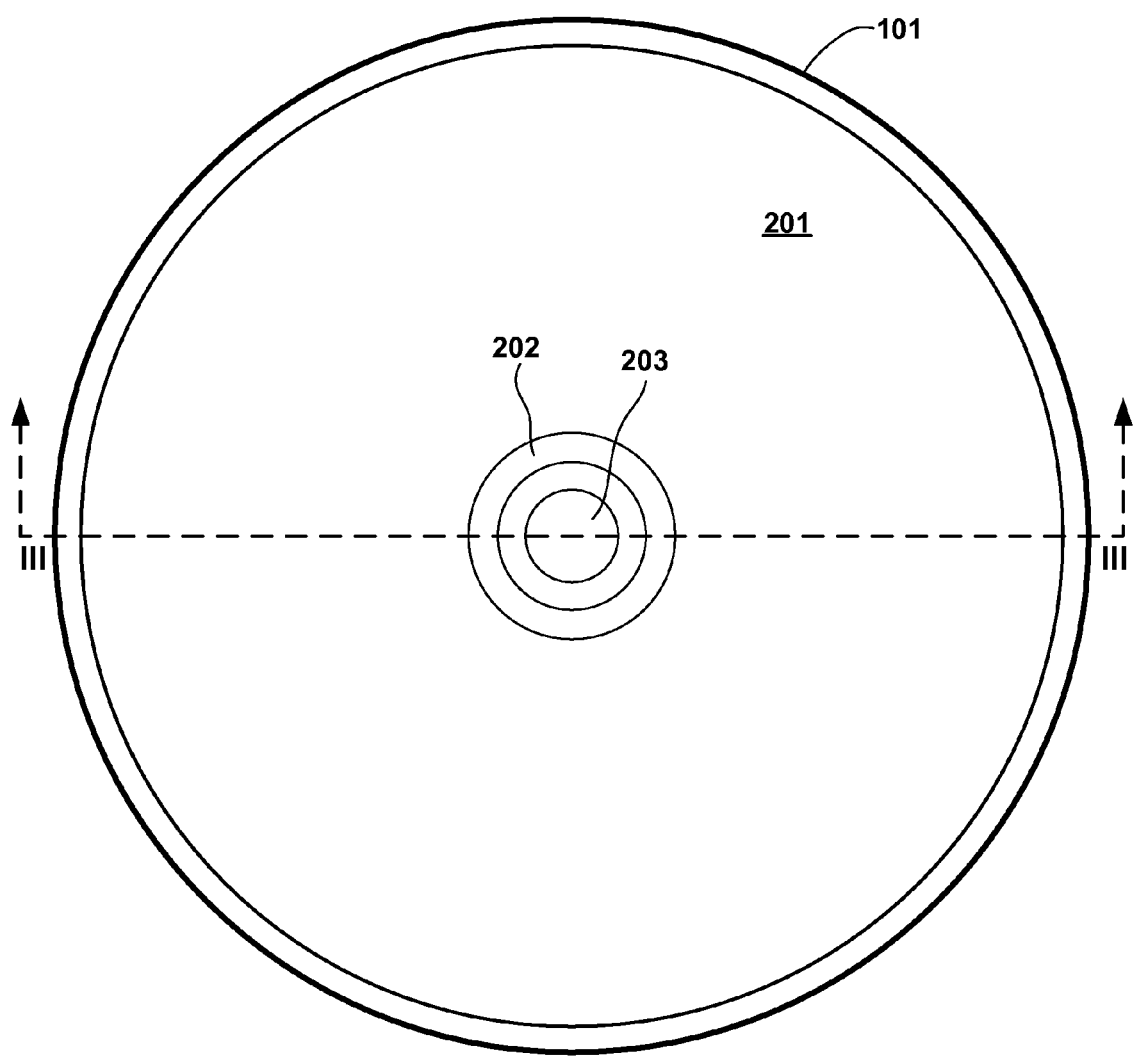
FIG. 2 is a top plan view of a charging device for a portable electrical device, according to the preferred embodiment.
Figure 3:
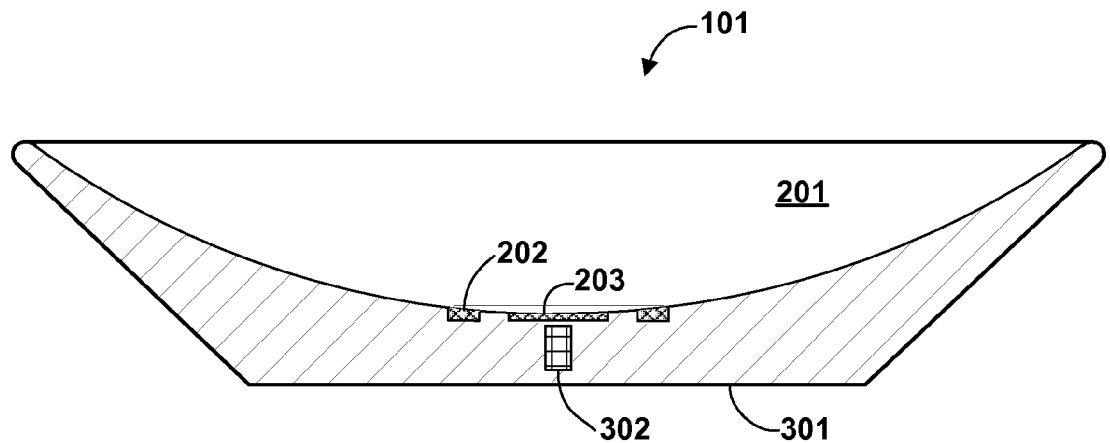
FIG. 3 is a simplified sectional view of the charging device of FIG. 2 in the plane of the central axis, according to the preferred embodiment.

FIGS. 2 and 3 are respectively a simplified top plan view and simplified cross sectional view in a vertical plane of charging device 101, according to the preferred embodiment. Charging bowl 101 is a generally bowl-shaped device, having a base 301 for resting on a horizontal surface and an upwardly exposed concave surface 201 for receiving and mating with a portable rechargeable device. The mating surface is preferably radially symmetrical about a central substantially vertical axis, the vertical axis being perpendicular to the plane of FIG. 1. FIG. 2 is a cross section in the plane of the vertical axis. A cross section of mating surface 201 in a horizontal plane (perpendicular to the vertical axis) is a circle centered at the vertical axis.

Figure 4:
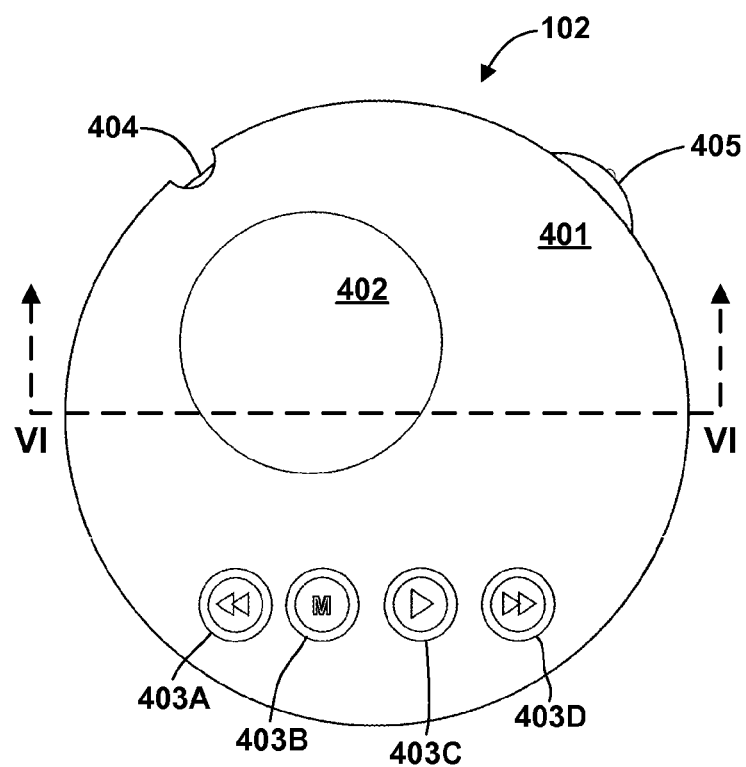
FIG. 4 is a simplified front plan view of a digital music player as an exemplary portable electrical device, according to the preferred embodiment.
Figure 5:
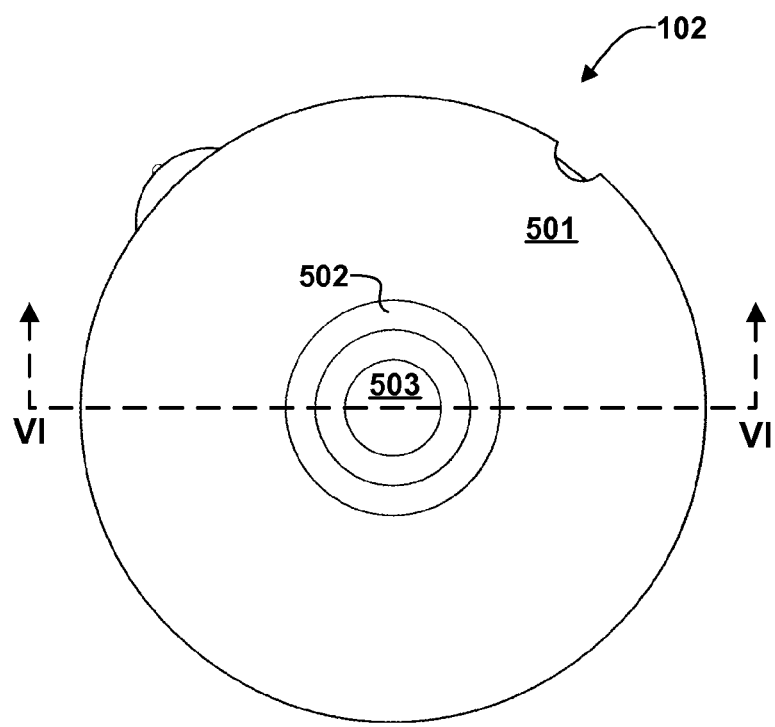
FIG. 5 is a simplified rear plan view of the exemplary portable electrical device, according to the preferred embodiment.
Figure 6:
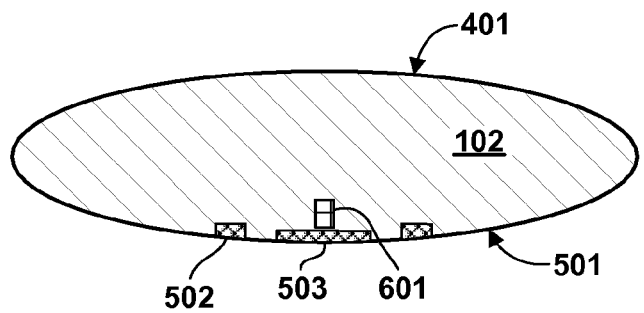
FIG. 6 is a simplified sectional view of the exemplary portable electrical device in the plane of the central axis, according to the preferred embodiment.

FIGS. 4, 5 and 6 are respectively a simplified front plan view, simplified rear plan view, and simplified cross sectional view in a vertical plane of portable electrical device 102, according to the preferred embodiment. In this embodiment, portable electrical device 102 is a portable digital music player which is generally in the shape of a disc, and having a central axis. The planes of FIGS. 4 and 5 are perpendicular to the central axis, while FIG. 6 is a cross section in a plane of the central axis. In this embodiment, the cross section in a plane of the central axis is generally an elongated oval shape approximating an elongated ellipse, the profile of the front face being substantially symmetrical to the profile of the rear face, although such symmetry is not a functional requirement. Although the basic outlines of device 102 define a disc, various functional features are present which defeat perfect radial symmetry. The front face 401 of device 102 contains features of a user interface enabling a user to control the device. As shown in FIG. 4, the front face includes a visual display 402 for displaying information to the user, and various control buttons 403A-D for receiving user input. A headphone jack 404 and thumbwheel control 405 (e.g., for volume) are located along the circumferential edge of the discus. The rear face 501 includes a mating surface which mates with corresponding mating portion of charging bowl surface 201. The mating surface of rear face 501 is generally radially symmetrical about the central axis, conforming to the corresponding mating surface of the bowl. Specifically, a cross section of the rear face in a place perpendicular to the central axis defines a circle.

A pair of electrical contacts 202, 203 of opposite polarity is embedded in charging bowl surface 201. The contacts mate with corresponding contacts 502, 503 of opposite polarity in the corresponding mating surface of rear face 501 on the portable device to provide a charging current to the portable device when the portable device is properly positioned within the charging bowl, i.e., is positioned so that the central axis of the portable device is substantially coincident with the vertical axis of the charging bowl. In the preferred embodiment, contacts 203 and 503 are in the shape of a circle, and contacts 202 and 502 are in the shape of a ring surrounding respective contacts 203 and 503, although other shapes are possible. Both contacts 202 and 203 are centered on the vertical axis of the charging bowl; both contacts 502 and 503 are centered on the central axis of the portable device. In will be understood that in the simplified views of FIGS. 2-6, certain features not essential to an understanding of the present invention have been omitted for clarity. In particular, the digital music player contains electronic elements mounted in the interior thereof as required to perform the device function, and the charging bowl similarly contains interior electronic elements. These devices may further contain decorative features, status indicator lights, and additional exterior elements not visible in the simplified representations of FIGS. 2-6.

In operation, the user engages the charging device by placing or dropping the portable device in the charging bowl. The portable device sinks to the bottom of the bowl by force of gravity, or optionally, with an additional force of magnetic attraction. The portable device need not be placed in the center of the bowl, but can be placed anywhere within the bowl. In particular, the user need not align contacts 502, 503 in the portable device with corresponding contacts 202, 203 in the charging device when placing the portable device in the charging bowl. It could even be placed on the edge of the bowl, with a portion of the portable device extending out of the bowl, provided that the device's center of gravity is within the bowl's edge. The portable device need not have any particular angular orientation with respect to the bowl. The central axis of the portable device upon placement in the bowl need not be vertically oriented, and can be at an oblique angle, provided that the orientation and center of gravity of the portable device will cause it to rotate its rear face 501 to face downward. as it drops to the bottom of the bowl. In the preferred embodiment, contacts 502, 503 are located only on the rear face 501 of the portable device, requiring the user to at least assure that the device is placed in the bowl so that the rear face will face downward. It would alternatively be possible to place contacts on both front and rear faces, obviating this requirement.

Figure 7A:
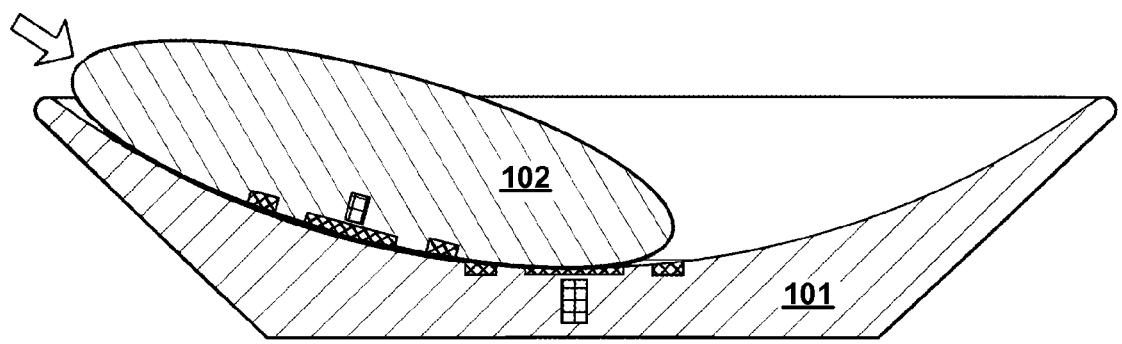
FIGS. 7A and 7B are cross-sectional views representing the positioning of the portable electrical device in the charging device for recharging, FIG. 7A showing an initial placement of the portable device in an unaligned position, and FIG. 7B showing the final resting place of the portable device in an aligned position, according to the preferred embodiment.
Figure 7B:
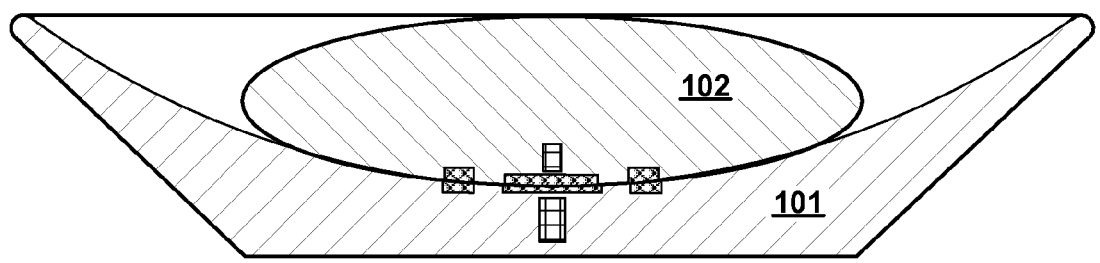

The positioning of the portable device in the bowl is represented in FIGS. 7A and 7B. FIG. 7A is a cross sectional representation of the portable device initially placed in the charging bowl in an unaligned position, i.e., in a position in which contacts 502, 503 in the portable device are not aligned with corresponding contacts 202, 203 in the bowl. In this unaligned position, a gravitational force (optionally assisted by a magnetic force) draws the portable device in the direction shown by the arrow in FIG. 7A. The gravitational force (and optional magnetic force) eventually cause the portable device to rest at the bottom of the charging bowl, in the position shown in FIG. 7B. In this position, the central (vertical) axis of the charging bowl and the central axis of the portable device are substantially coincident, and the contacts are aligned. It will be noted that, because the contacts are either circular or annular, the contacts are aligned regardless of the angular orientation of the charging device with respect to the bowl about the central axis. The portable device can assume any arbitrary angular orientation about the central axis.

Figure 8:
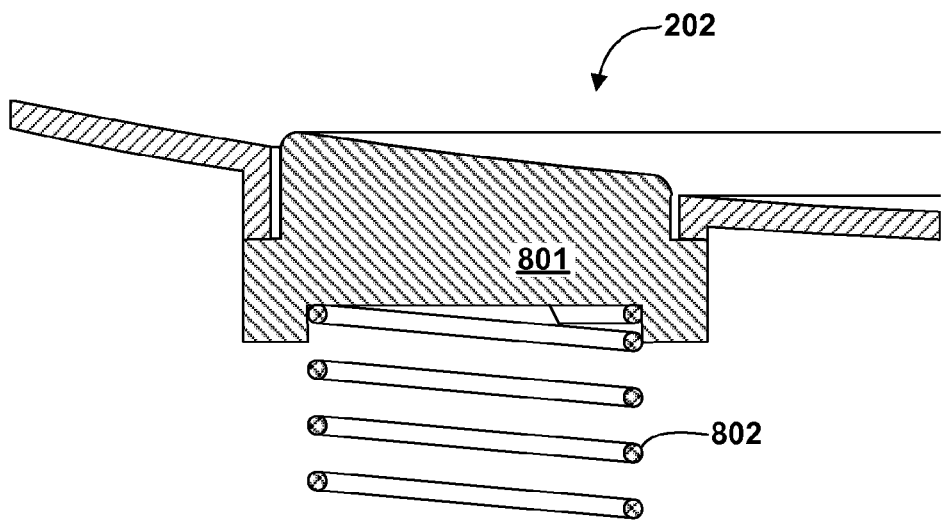
FIG. 8 is an enlarged sectional view of a portion of a contact, according to the preferred embodiment.

Preferably, contacts 202, 203 are spring loaded to exert a force against the surface of mating contacts on the portable device when the portable device is in charging position. FIG. 8 is an enlarged view of a portion of contact 202. As shown in FIG. 8, contact 202 comprises a solid metal conductor 801 in the shape of a ring (shown in partial cross-section in FIG. 8), which is supported by a spring 802. Spring 802 could be constructed as multiple circumferentially spaced helical springs (one of which is represented in FIG. 8), or with beam springs, conical springs, or any of various types of springs as are known. A flange 803 on the ring 801 engages the walls of the charging bowl's surface. When the portable device is not present, the springs force the flange to abut the walls of the bowl, causing the contact to project slightly from mating surface 201. The weight of the portable device depresses the contacts so that the springs force the two contact surfaces together. The contacts are rounded at the projecting edges to allow the portable device to slide freely over them when initially assuming the charging position. Although only contact 202 is illustrated in FIG. 8, it will be appreciated that a spring loading mechanism can be similarly constructed for contact 203. In the preferred embodiment, only the bowl contacts are spring loaded, the contacts on the portable device being fixed with respect to the device's surface. It would alternatively be possible to construct the portable device with spring loaded contacts, although this approach is not preferred because it adds weight and complexity to the portable device, and may subject the spring-loading mechanism to damage from frequent handling. It alternatively may be possible to forego spring loading altogether any rely on gravitational or other forces to achieve sufficient contact.

Figure 14:
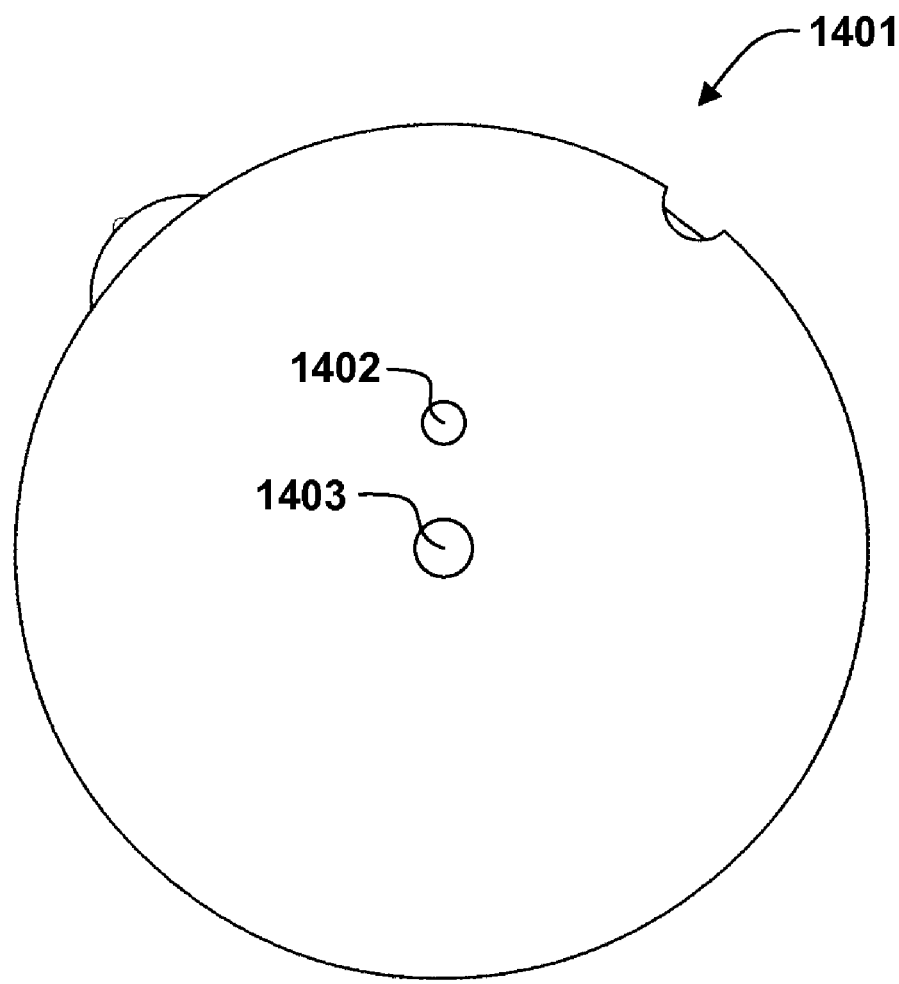
FIG. 14 is a simplified rear plan view of the a portable electrical device in which charging contacts are configured according to an alternative embodiment.

As described above, both sets of contacts form circles and concentric rings according to the preferred embodiment, this arrangement providing electrical contact between the two devices regardless of the angular orientation of the portable device with respect to the charging bowl. However, there are alternative configurations of contacts which will also provide contact an any arbitrary angular orientation. In particular, if only one of the charging bowl or the portable device contains a ring, the other device may contain a much smaller contact (or multiple smaller contacts) located at the same radial distance from the central axis as the ring. In this case, since the ring is continuous, the smaller contact or contacts will engage the ring at any arbitrary angular orientation of the portable device, so long as the central axis of the portable device is substantially coincident with the central axis of the charging bowl. FIG. 14 illustrates such an alternative arrangement of contacts on the rear surface of a portable rechargeable device 1401, which is similar to portable device 102 except for the arrangement of contacts. In this alternative embodiment, contacts 1402, 1403 engage bowl contacts 202, 203 respectively. Although contact 1402 is only an off-center circular contact, because contact 202 is annular, it will engage contact 202 regardless of the angular orientation of device 1401. Of course, it would also have been possible to maintain the same contact geometry in the portable device, and use the geometry of FIG. 14 in the charging bowl contacts. Additional variations in contact geometry are possible.

Depending on the design of the charging bowl and portable device interface, it is possible that gravitational force alone will not be reliably sufficient to position the portable device at the bottom of the charging bowl, with its contacts centered on the vertical axis of the bowl. As the portable device approaches the bottom of the bowl, the angle of the inclined surface on which it rests decreases, reducing the gravitational force. At some point, frictional forces of the contacting surfaces may cause the portable device to come to rest at a position slightly short of the bottom of the charging bowl. If the shapes of the mating surfaces and coefficients of friction are such that the gravitational force alone is insufficient to reliably align the contacts on the devices, an optional additional alignment force may be provided. Preferably, this additional alignment force is provided by optional magnet 302 placed within the charging device, and located at the bottom of the bowl surface 201, as shown in FIG. 3. Magnet 302 exerts an attractive force on a complementary magnet 601 or ferromagnetic material (as shown in FIG. 6) in the portable device, thus providing additional force (i.e., beyond gravitational force) to position the portable device so that it is centered at the bottom of the bowl. Although magnets 302, 601 are represented in the Figures as located behind respective circular contacts 203, 503, as a further alternative, one or both devices may contain an annular ring in place of the circular contact. I.e., instead of a ring contact 202 or 502 surrounding a central circular contact 203 or 503, a device could contain a pair of concentric annular rings, the inner ring having an inner radius sufficiently large to accommodate magnet 302 or 601. Such an arrangement may be desirable because it brings the magnets into greater proximity with each other, thus increasing the attractive force exerted on the portable device. There may be other techniques for providing an additional alignment force.

Charging bowl receives electrical energy from an external source (not shown), from which it provides charging current to the portable device. The current provided to the portable device is preferably a DC current having a voltage compatible with the batteries in the portable device. Electrical energy is preferably obtained from a line voltage, which typically means it must be transformed to a lower voltage and rectified before being supplied to the portable device. Power conversion electronics for performing the required transformation and rectification may be located within charging bowl 100, or in an external power conversion device, or may partially located within charging bowl 100 and partially in an external power conversion device. Alternatively, it is possible to locate some of the power conversion electronics within the portable device itself, although this is generally not preferred because it tends to increase the size and/or weight of the portable device, and because the charging interface should be at a low voltage for safety reasons.

It will be observed that, due to the radial arrangement of the contacts, if the portable device is initially placed at the edge of the charging bowl and allowed to slide downwards to the bottom of the bowl, first the outer ring contact 502 and then the center contact 503 will bridge between the two contacts 202, 203 on the charging bowl. Normally, this will cause only a momentary electrical short between the contacts on the charging bowl as the portable device travels to the aligned position, although in unusual circumstances the portable device may become stopped in a shorted position. For these reasons, it is preferred that the power conversion electronics contains protection against such circumstances, either as an inherent part of its design or by use of some form of protection circuit. Various forms of protection circuits are known in the art, and any such circuit, now known or hereafter developed, may be employed. Perhaps the simplest form of protection is a current limiting circuit which limits the maximum charging current provided to charging device to some safe, relatively small value. Other, more sophisticated, forms of short protection are possible, such as short detection circuits which would automatically switch the charging current off upon detecting a contact-to-contact resistance below some small value. For similar reasons, some form of protection may be necessary in the portable device to prevent discharging a battery when one of the contacts of the charging device shorts the contacts of the portable device. In this latter case, it is only necessary to protect current flowing backward through the contacts, (i.e., the reverse of normal current flow during recharging). Therefore a series diode at the contact should be sufficient to prevent discharge, although other forms of protection might alternatively be used.

Alternative Mating Surface Configuration Examples

The mating surface configuration of the preferred embodiment, described above and represented in FIGS. 1-6, is but one possible embodiment of the present invention. Numerous alternative configurations of the devices and mating surfaces are possible. Some of these alternative configurations are described below and represented in FIGS. 9-13. It should be understood that these alternative configurations are shown and described by way of illustration and not by limitation, and are not intended as an exhaustive enumeration of all possible alternative configurations consistent with the present invention.

In the preferred embodiment, the mating surfaces define a circle in a plane perpendicular to the central or vertical axes. A circle is perhaps the simplest implementation of the present invention, although by no means the only such implementation. A mating surface might alternatively define any of various shapes in a plane perpendicular to the central or vertical axes, which may or may not be symmetrical about the axes. Such alternative shapes may be employed for a variety of functional and/or aesthetic reasons. By way of example, such alternative shapes may include regular polygons, star shapes, and ellipses or other elongated, rounded shapes.

Figure 9:
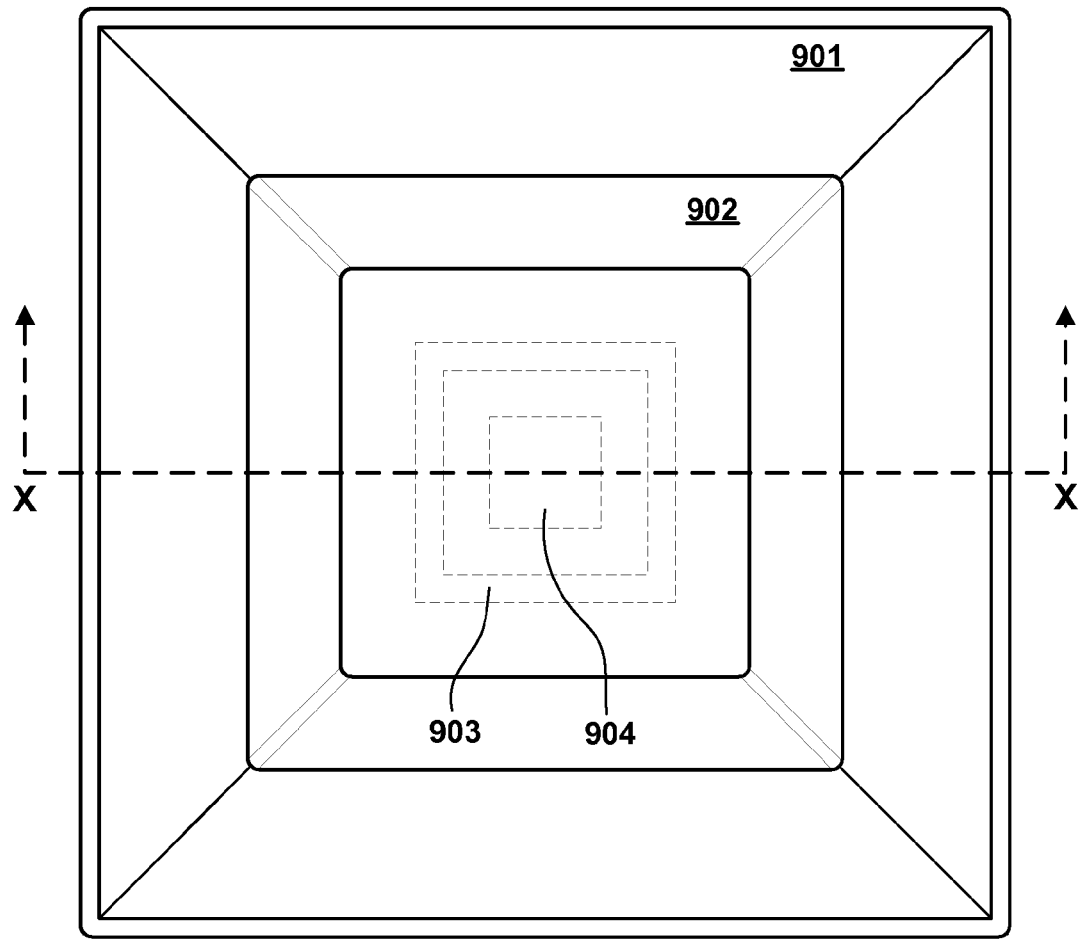
FIG. 9 is a simplified top plan view of a charging device and portable electrical device having a square horizontal cross-section, the devices being in recharging position, according to an alternative embodiment of the present invention.
Figure 10:
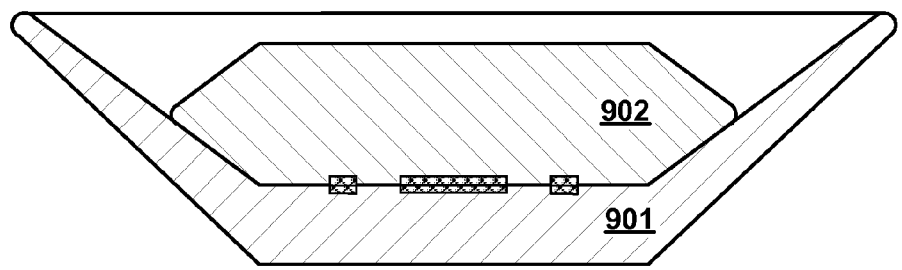
FIG. 10 is a simplified sectional view in the plane of the central axis of a charging device and portable electrical device in recharging position, according to the alternative embodiment of FIG. 9.

FIGS. 9 and 10 are respectively a top plan view and a sectional view in the central axis of a charging device 901 and portable device 902, according to an alternative embodiment of the present invention. FIGS. 9 and 10 show the two device in an aligned position for recharging the portable device. In this alternative embodiment, the mating surfaces define a regular polygon, specifically a square, in the plane perpendicular to the central axis. It will be understood that as a further alternative, the mating surfaces could define a regular polygon having a number of sides other than four, and/or that the corners may have radiuses.

In the alternative embodiment of FIGS. 9 and 10, the contacts are a central square 904 and a hollowed square-shaped region 903 surrounding the central square. It will be observed that these contacts are not aligned at any arbitrary angular orientation of the portable device 902 with respect to the charging device 901, but are aligned only when the flat sides of the mating surfaces coincide. I.e., alignment occurs only at any of four discrete angular positions of the portable device with respect to the charging device about the central axis. Although the portable device must be aligned to one of these four discrete positions for recharging, no pre-alignment is required by the user. As in the case of the circular mating surface of the preferred embodiment, the user simply drops or places the portable device in the charging bowl at any arbitrary angular position. The force of gravity (optionally assisted by magnets) causes the portable device to rotate about its central axis to one of the four aligned positions at the same time that is sinks to the bottom of the charging bowl.

Figure 11:
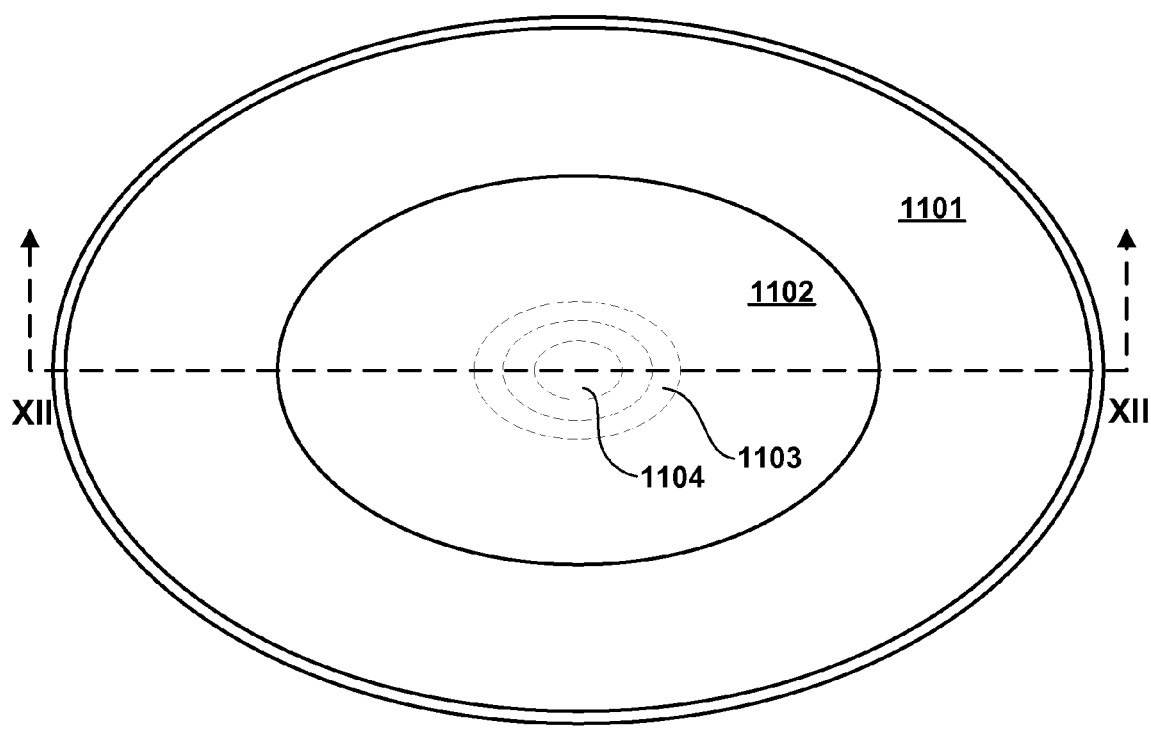
FIG. 11 is a simplified top plan view of a charging device and portable electrical device having an elliptical horizontal cross-section, the devices being in recharging position, according to a second alternative embodiment of the present invention.
Figure 12:
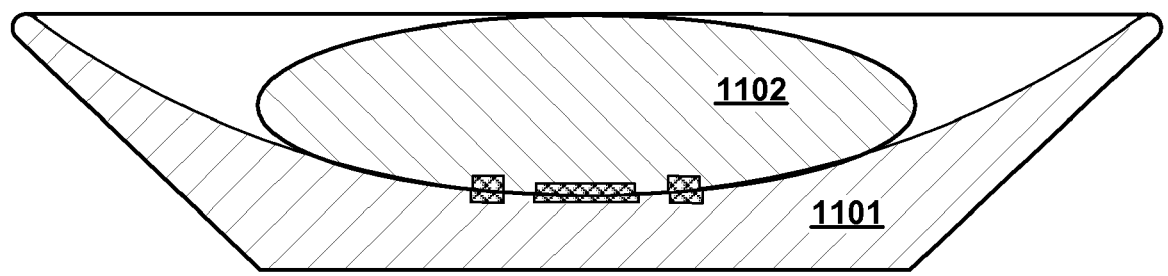
FIG. 12 is a simplified sectional view in the plane of the central axis of a charging device and portable electrical device in recharging position, according to the second alternative embodiment of FIG. 11.

FIGS. 11 and 12 are respectively a top plan view and a sectional view in the central axis of a charging device 1101 and portable device 1102, according to a second alternative embodiment of the present invention. FIGS. 11 and 12 show the two device in an aligned position for recharging the portable device. In this second alternative embodiment, the mating surfaces define an elongated curved figure, specifically an ellipse, in the plane perpendicular to the central axis. It will be understood that as a further alternative, the mating surfaces could define some other form of elongated curved figure, or could define an elongated polygon which generally follows the outlines of an ellipse or similar oval figure, which may or may not have radiuses at the corners thereof.

In the alternative embodiment of FIGS. 11 and 12, the contacts are a central filled ellipse 1104 and a hollowed annular elliptical region 1103 surrounding the central ellipse. As in the case of the square embodiment of FIGS. 9 and 10, these contacts are not aligned at any arbitrary angular orientation of the portable device 1102 with respect to the charging device 1101, but are aligned only when the line segments defined by the focal points of the ellipses are substantially parallel, i.e., alignment occurs at only two discrete angular positions of portable device 1102 with respect to charging device 1101 about the central axis. As in the case of the embodiment of FIGS. 9 and 10, no pre-alignment is required by the user. The user drops or places portable device 1102 in the charging bowl at any arbitrary angular position. The force of gravity (optionally assisted by magnets) causes the portable device to rotate about its central axis to one of the two aligned positions at the same time that is sinks to the bottom of the charging bowl.

The mating surface configuration of the preferred embodiment is an elongated, rounded surface in the plane of the vertical or central axes, in which the dimension of the portable device in a direction parallel to the central axis is significantly shorter than in a direction perpendicular to the central axis, so that the mating surface is a rounded, flattened portion of the portable device. However, it would alternatively be possible to construct the portable device with a longer dimension parallel to the central axis, and a shorter dimension perpendicular to the axis. Such an alternative embodiment is illustrated in FIG. 13.

Figure 13:
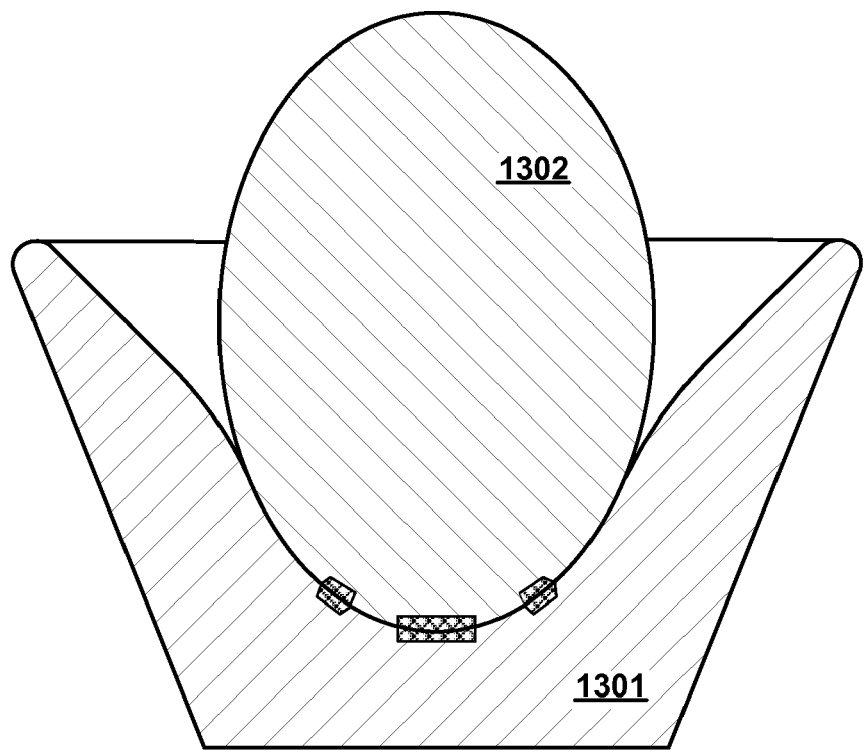
FIG. 13 is a simplified sectional view in the plane of the central axis of a charging device and portable electrical device in recharging position, according to a third alternative embodiment.

FIG. 13 is a simplified cross-section in the plane of the central axis, showing a charging device 1301 and portable electrical device 1302, according to a third alternative embodiment. In this embodiment, it may be assumed that the charging device and portable electrical device are radially symmetrical about the central axes thereof, and specifically, that a cross-section of the mating surface in a plane perpendicular to the central axis defines a circle, as in the preferred embodiment (although other shapes are possible, as explained above). However, unlike the previous embodiments, the dimension of the portable device parallel to the central axis is substantially longer than the dimension perpendicular to the axis. The shape of the portable device therefore more nearly resembles a sausage than a saucer. The charging device is accordingly provided with a relatively deep bowl or well, into which the narrow end of the sausage-shaped portable device is dropped.

Although FIGS. 9 and 10 show an alternative mating surface configuration which is aligned in four discrete angular positions about the central axis, and FIGS. 11 and 12 show an alternative configuration with is aligned in two discrete angular positions about the central axis, it would be possible to design configuration aligning in a different number of discrete angular positions. Furthermore, it would be possible to design mating surface configurations which are not symmetrical about a central axis, and/or which align in only a single angular position of the portable device, using a force of gravity and/or some other force, such as a magnetic force. A simple example of a device which aligns at only a single angular position is a device having a circular horizontal cross-section (as in the preferred embodiment), but having one or more offset magnets for rotating the portable device to a particular desired angular position. Alternatively, the mating surfaces themselves can be designed to rotate the portable device to a desired single angular position using gravity, in which case the mating surfaces are necessarily not radially symmetrical. An example of such a mating surface is a shape defined by an inverted cone intersected by a plane at an oblique angle to the central axis of the cone. It will be appreciated that numerous other shapes are possible.

All of the configurations shown in the various figures employ a generally concave charging bowl surface and convex charging surface on the rechargeable device. However, it would alternatively be possible for the charging device to have a convex surface and the rechargeable device to have a concave surface.

Various alternative mating surface shapes have been disclosed herein in order to express a small sample of the possible range of alternatives. In general, the saucer shape of the preferred embodiment is believed to be simplest from the standpoint of assuring proper alignment under a wide range of uses. However, there may well be other considerations on the design of a portable electrical device which suggest another shape. For example, if the portable electrical device is a cell phone, it is generally considered desirable that the device be elongated to bridge at least part of the space between the user's mouth and ear. In this case, it may be desirable to use a shape similar to one of those shown in FIGS. 11-12 or FIG. 13.

Further Alternative Embodiments and Implementations

In the exemplary implementation described above, the portable electrical device is a digital audio player. However, it will be appreciated that a wide variety of portable rechargeable electrical devices exist to which the present invention might be applied, some of which have been specifically mentioned herein. The present invention is not limited to digital audio players or any other examples specifically discussed herein, and further is not limited to devices of the type currently known or contemplated. Just as personal digital assistants and many other devices were unknown until relatively recently, it is anticipated that, with further progress in the electrical arts, new portable electrical devices, now unknown, will be developed. The present invention may provide a useful charging interface appropriate for at least some of these new portable electrical devices.

In the implementations described above, it has generally been assumed that the base of the charger rests on a flat surface such as a shelf, but the charger might alternatively be mounted by mechanical means to a vertical wall or other member. In particular, where used in a motor vehicle, the charger would preferably be firmly attached to some portion of the vehicle. In any such application, the charger might be mounted on a retractable apparatus.

In the above description, it has generally been assumed that the portable electrical device stores energy in "batteries", which are periodically recharged. Conventionally, batteries are chemical cells in which energy is stored in chemical form, from which it is converted to electrical energy. However, the present invention is not limited to any particular form of energy storage, and a portable, rechargeable device could use any appropriate form of stored energy, now known or hereafter developed. For example, it is possible to store electrical energy in a capacitor, and while conventional capacitors are generally inferior to chemical batteries for providing electrical energy to portable music players and similar devices, future improvements to capacitors or other devices may make their use for powering portable devices more desirable.

In the above description, it has been assumed than an electrical current passes between the charging device and the portable device by means of "contacts". While this is the most common method of supplying electrical energy to a rechargeable electrical device, it is not necessarily the only such means. It is alternatively possible to supply electrical energy for recharging the portable device by induction through an electromagnetic field, without the actual passage of current between the devices. However, even in this case it is generally necessary to align the portable device with respect to the charging device, and the present invention could be applied to a charger which induces a current in the portable device when the latter is in an aligned position in a bowl or equivalent charging structure.

Although a specific embodiment of the invention has been disclosed along with certain alternatives, it will be recognized by those skilled in the art that additional variations in form and detail may be made within the scope of the following claims:

What is claimed is:

1. An apparatus, comprising:
at least one device from a set of devices consisting of: (a) a portable electrical device capable of storing electrical energy and requiring periodic recharging, and (b) a charging device for supplying electrical energy to said portable electrical device during recharging thereof;
wherein said portable electrical device and said charging device comprise respective complementary mating surfaces which transmit electrical energy from said charging device to said portable electrical device during recharging of said portable electrical device, each said mating surface having a respective first plane of symmetry bisecting the mating surface, the mating surface being symmetrical about the respective first plane of symmetry, and a respective second plane of symmetry bisecting the mating surface and perpendicular to the respective first plane of symmetry, the mating surface being symmetrical about the respective second plane of symmetry, each said mating surface defining an elongated convex curved figure in a plane perpendicular to both its respective first plane of symmetry and its respective second plane of symmetry, said respective complementary mating surfaces being in an aligned configuration opposing each other in which said first planes of symmetry and said second planes of symmetry are substantially coincident during recharging; and
wherein said portable electrical device is placed upon said charging device by a user, said portable electrical device aligning its mating surface with respect to the mating surface of the charging device automatically using a gravitational force.

2. The apparatus of claim 1, wherein the mating surface of said charging device is an upwardly facing concave surface and the mating surface of said rechargeable device is a downwardly facing convex surface, said gravitational force causing said rechargeable device to sink to the bottom of said concave surface of said rechargeable device to automatically align said surfaces.

3. The apparatus of claim 1, wherein each said complementary mating surface defines an ellipse in a plane perpendicular to both its respective first plane of symmetry and its respective second plane of symmetry.

4. The apparatus of claim 1, wherein the mating surface of said at least one device comprises a set of electrical contacts for mating with contacts of the other mating surface of said complementary mating surfaces to transmit electrical current for recharging said portable electrical device.

5. The apparatus of claim 1, said at least one device further comprising a magnet for providing a force to automatically align said mating surfaces with respect to each other.

6. The apparatus of claim 1, wherein said portable electrical device comprises a digital music player.

7. An apparatus, comprising:
at least one device from a set of devices consisting of: (a) a portable electrical device capable of storing electrical energy and requiring periodic recharging, and (b) a charging device for supplying electrical energy to said portable electrical device during recharging thereof;
wherein said portable electrical device and said charging device comprise respective complementary mating surfaces which transmit electrical energy from said charging device to said portable electrical device during recharging of said portable electrical device, each said mating surface having a respective first plane of symmetry bisecting the mating surface, the mating surface being symmetrical about the respective first plane of symmetry, and a respective second plane of symmetry bisecting the mating surface and perpendicular to the respective first plane of symmetry, the mating surface being symmetrical about the respective second plane of symmetry, each said mating surface defining an elongated convex curved figure in a plane perpendicular to both its respective first plane of symmetry and its respective second plane of symmetry, said respective complementary mating surfaces being in an aligned configuration opposing each other in which said first planes of symmetry and said second planes of symmetry are substantially coincident during recharging; and
wherein said mating surfaces are aligned in a first configuration and in a second configuration, said second configuration being a configuration in which the mating surface of said portable electrical device is rotated 180 degrees from the first configuration about a central axis with respect to the mating surface of said charging device, said central axis being the intersection of the first plane of symmetry of said mating surface of said portable electrical device and the second plane of symmetry of said mating surface of said portable electrical device.

8. The apparatus of claim 7, wherein said complementary mating surfaces are shaped to automatically align said surfaces with respect to each other using a gravitational force.

9. The apparatus of claim 8, wherein the mating surface of said charging device is an upwardly facing concave surface and the mating surface of said rechargeable device is a downwardly facing convex surface, said gravitational force causing said rechargeable device to sink to the bottom of said concave surface of said rechargeable device to a position in which said vertical axes are substantially coincident.

10. The apparatus of claim 7, wherein the mating surface of said at least one device comprises a set of electrical contacts for mating with contacts of the other mating surface of said complementary mating surfaces to transmit electrical current for recharging said portable electrical device.

11. The apparatus of claim 7, wherein each said complementary mating surface defines an ellipse in a plane perpendicular to both its respective first plane of symmetry and its respective second plane of symmetry.

12. The apparatus of claim 7, said at least one device further comprising a magnet for providing a force to automatically align said mating surfaces with respect to each other.

13. The apparatus of claim 7, wherein said portable electrical device comprises a digital music player.

* * * * *